US012505630B2

(12) United States Patent
Realegeno et al.

(10) Patent No.: US 12,505,630 B2
(45) Date of Patent: Dec. 23, 2025

(54) EXTENDED REALITY DRIVE SCANNER

(71) Applicant: Dell Products L.P., Round Rock, TX (US)

(72) Inventors: Claudia Realegeno, Maple Valley, WA (US); Claudia Lopez Rhea, Collierville, TN (US); Jason J Duquette, Sturbridge, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 108 days.

(21) Appl. No.: 18/625,473

(22) Filed: Apr. 3, 2024

(65) Prior Publication Data

US 2025/0316027 A1 Oct. 9, 2025

(51) Int. Cl.
*G06T 19/00* (2011.01)
*G02B 27/01* (2006.01)
*G06F 3/01* (2006.01)
*G06F 11/07* (2006.01)

(52) U.S. Cl.
CPC .......... *G06T 19/006* (2013.01); *G02B 27/017* (2013.01); *G06F 3/016* (2013.01); *G06F 11/0793* (2013.01); *G02B 2027/0178* (2013.01)

(58) Field of Classification Search
None
See application file for complete search history.

(56) References Cited

U.S. PATENT DOCUMENTS

| 2005/0151660 | A1* | 7/2005 | Mou ................. G08B 5/22 340/531 |
| 2005/0283392 | A1* | 12/2005 | Garrow ............ G06Q 10/06312 705/7.22 |
| 2015/0095095 | A1* | 4/2015 | Sorensen ......... G06Q 10/06315 705/7.26 |
| 2020/0409780 | A1* | 12/2020 | Balasubramanian ....... G06F 9/3838 |
| 2021/0131935 | A1* | 5/2021 | Sutherland ......... G01M 5/0041 |
| 2021/0173391 | A1* | 6/2021 | Parazynski ............ G05D 1/101 |

OTHER PUBLICATIONS

Author: Stefanini; Title: Augmented reality in data centers; Source: https://www.youtube.com/watch?v=2Jz6A-zjdgo; Date: Oct. 1, 2018; pp. 24 (Year: 2018).*

(Continued)

*Primary Examiner* — Jwalant Amin
(74) *Attorney, Agent, or Firm* — Amin, Turocy & Watson, LLP

(57) ABSTRACT

Extended reality drive scanning (e.g., using a computerized tool), is enabled. For example, a system can comprise a processor and a memory that stores executable instructions that, when executed by the processor, facilitate performance of operations. The operations can comprise scanning, via a camera, a drive rack, wherein the drive rack comprises a group of drives. The operations can further comprise, based on an indicator light of a drive of the group of drives and an identifier of the drive, determining a maintenance status of the drive. The operations can further comprise, based on the maintenance status of the drive, generating an extended reality user interface applicable to the maintenance status of the drive.

20 Claims, 10 Drawing Sheets

(56) References Cited

OTHER PUBLICATIONS

Author: Engineer; Title: Project Satellite: Augmented Reality in Data Center Operations; Source: https://www.youtube.com/watch?v=SDoC2uwOt6s; Date: Dec. 3, 2020; pp. 1 (Year: 2020).*
Unknown "Dell AR Assistant Frequently Asked Questions (FAQ)" Dell Technologies, https://www.dell.com/support/kbdoc/en-us/000177613/dell-ar-assistant-frequently-asked-questions-faq, Last Accessed Mar. 11, 2024, 5 pages.

* cited by examiner

EXTENDED REALITY DRIVE SCANNER

BACKGROUND

Hardware drives in data center environments are often stacked in tall racks, in which the installed drives can vary by manufacturer, model, generation, or other attributes. Each of these drive hardware variations can be associated with different visual indicators of drive health.

The above-described background relating to data centers is merely intended to provide a contextual overview of some current issues and is not intended to be exhaustive. Other contextual information may become further apparent upon review of the following detailed description.

DETAILED DESCRIPTION

Figure 1:
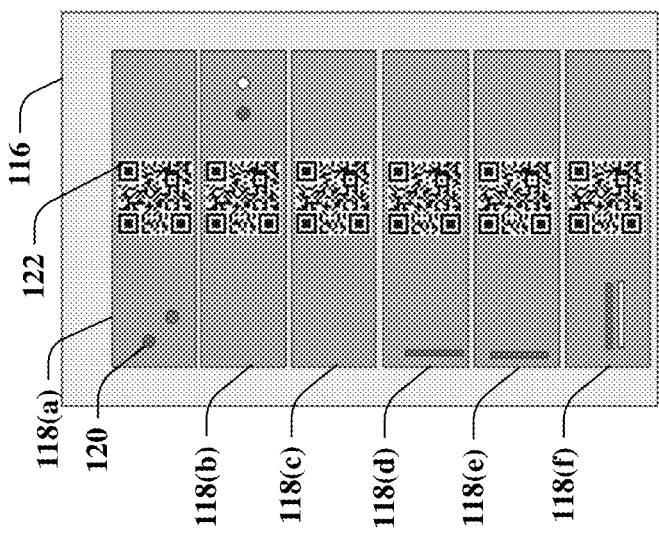
FIG. 1 is a block diagram of a non-limiting example system in accordance with one or more example embodiments described herein.
Figure 1:
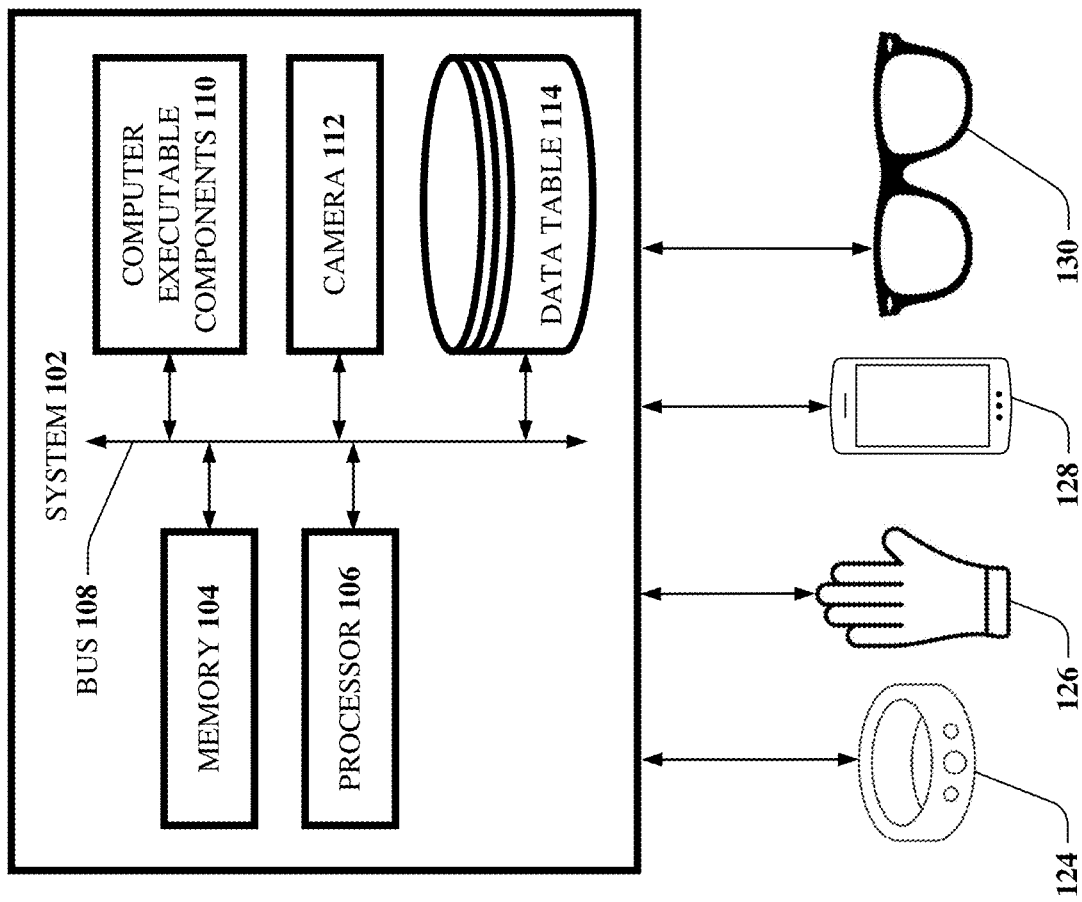

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, extended reality drive scanning can be improved in various ways, and various embodiments are described herein to this end and/or other ends. The disclosed subject matter relates to extended reality and, more particularly, to extended reality drive scanning (e.g., of drive racks in a data center). As mentioned in the background, because of drive hardware variation, drive hardware can be associated with different visual indicators of drive health. For example, drive health is typically conveyed via colored lights, such as light emitting diodes (LEDs), though the shape, color, placement, and blink rates can vary. A drive failure is typically conveyed with a light of a color or location different than that of a healthy and operational drive, and the specific arrangement for one drive may differ from that of another drive in the same data center or even in the same data rack. As new generations of hardware have adjusted these visual representations, many data center environments still maintain older hardware that is functional but does not offer user-friendly indicators. Additionally, small indicator lights can be overlooked by a user with poor visual acuity, or who is simply absent-minded or distracted when viewing the rack.

In this regard, users tasked with identifying and replacing unhealthy drives must be able to identify this critical information across a range of indicator lights. In practice, users may encounter various challenges with processing the information. Some examples include visual challenges with viewing the indicators, acuity to notice one different indicator when visually scanning a large number of devices, ability to keep track of a variety of devices that use different configurations to convey comparable information, understanding which actions, if any, to take upon identifying an unhealthy drive, and so on.

According to an example embodiment, a system can comprise a processor, and a memory that stores executable instructions that, when executed by the processor, facilitate performance of operations, comprising scanning, via a camera, a drive rack, wherein the drive rack comprises a group of drives, based on an indicator light of a drive of the group of drives and an identifier of the drive, determining a maintenance status of the drive, and based on the maintenance status of the drive, generating an extended reality user interface applicable to the maintenance status of the drive.

In one or more example embodiments, the extended reality user interface can comprise an overlay on a screen of a mobile device, the mobile device can comprise the camera, and the overlay can be rendered on the screen of the mobile device in real time or stored to the memory. In this regard, the overlay can comprise a color-coded overlay.

In one or more example embodiments, the extended reality user interface can comprise an overlay generated via extended reality glasses.

In one or more example embodiments, the extended reality user interface can comprise a haptic device, and the haptic device can generate haptic feedback at a rate based on a distance from the drive. In this regard, the haptic device can comprise a haptic glove, a haptic ring, or another means of delivering information through haptic feedback.

In one or more example embodiments, the maintenance status of the drive can be determined based on a comparison of a blinking pattern of the indicator light, a color of the indicator light, a shape of the indicator light, a size of the indicator light, or a placement of the indicator light for a model of drive applicable to the drive to a data table of blinking patterns, and the data table can comprise blinking patterns and colors per model of the group of drives.

In one or more example embodiments, the above operations can further comprise, in response to a change in the maintenance status of the drive, modifying the extended reality user interface based on the change in the maintenance status of the drive.

In one or more example embodiments, the above operations can further comprise, based on the identifier of the drive, determining historical maintenance information applicable to the drive, wherein the historical maintenance information is displayed via the extended reality user interface.

In one or more example embodiments, the above operations can further comprise, based on the maintenance status of the drive, generating a recommended action to correct a malfunction of the drive, wherein the recommended action is determined based on a comparison of the maintenance status for a model of drive applicable to the drive to a maintenance data table, and wherein the maintenance data table comprises recommended actions per model of the group of drives.

In one or more example embodiments, the above operations can further comprise, based on the maintenance status of the drive, generating a recommended action to correct a malfunction of the drive, wherein the recommended action is determined using machine learning trained based on prior actions to correct prior malfunctions of other drives, other than the drive.

In one or more example embodiments, the above operations can further comprise, in response to a determination that, based on the identifier of the drive, the drive is not registered in a defined drive registry, adding data applicable to the drive to the defined drive registry.

In another example embodiment, a non-transitory machine-readable medium can comprise executable instructions that, when executed by a processor, facilitate performance of operations, comprising scanning, via a camera, a server rack, wherein the server rack comprises multiple servers, based on an indicator light of a server of the multiple servers and an identifier of the server, determining a maintenance status of the server, and based on the maintenance status of the server, generating an extended reality user interface applicable to the maintenance status of the server.

In one or more example embodiments, the extended reality user interface can comprise an overlay on a screen of a mobile device, and the mobile device can comprise the camera. In this regard, the overlay can comprise a color-coded overlay.

In one or more example embodiments, the extended reality user interface can comprise an overlay on extended reality glasses.

In yet another example embodiment, a method can comprise imaging, by a system comprising at least one processor, a drive rack, wherein the drive rack comprises drives, based on an indicator light of a drive of the drives and a unique identifier of the drive, determining, by the system, a maintenance event applicable to the drive, and based on the maintenance event, generating, by the system, an extended reality user interface applicable to the maintenance event.

In one or more example embodiments, the extended reality user interface can comprise a haptic device, and the haptic device can output haptic feedback at a rate based on a distance from the drive. In this regard, the haptic device can comprise a haptic glove, a haptic ring, or another means of delivering information through haptic feedback.

In one or more example embodiments, the maintenance event can be determined based on a comparison of a blinking pattern of the indicator light, a color of the indicator light, a shape of the indicator light, a size of the indicator light, or a placement of the indicator light for a model of drive applicable to the drive to a data table of blinking patterns, and the data table can comprise blinking patterns and colors per model of the drives.

Various embodiments herein enable scanning of a hardware rack to interpret and indicate a drive's alert status (e.g., maintenance status), for instance, via an application (e.g., via a screen of a mobile device) or wearable device using extended reality (XR), for instance, by leveraging a data table (e.g., of defined indicator light colors and/or patterns) and related application programming interfaces (APIs). Embodiments herein address accessibility concerns while providing an improved user experience for all users. By leveraging various embodiments herein, a user can point a device or system herein toward a data rack of drives herein. The device or system herein can then scan the data rack for alert (e.g., maintenance required) indicators and generate additional guidance (e.g., recommended resolution action). Various embodiments herein can utilize XR tools, such as corresponding wearable devices (e.g., glasses, gloves, etc.).

Various embodiments herein can leverage a lookup library (e.g., of a data table herein) of various hardware devices (e.g., drives) and their corresponding indicator configurations. A nonlimiting example lookup library can comprise a data table containing device details, images, and/or videos detailing a variety of maintenance statuses (e.g., healthy and/or alert states). The images enable the XR drive scanning system to match the scanned items and indicators to registered hardware (e.g., a drive) for interpretation of the visual content. By utilizing videos in the lookup table, the system can interpret key movement-related indicators, such as blink rates. Further, the system can identify and/or interpret particularly problematic combinations of alert statuses, such as a pattern of alerts on one node or at a cable that connects to the network. Thus, this data table can be utilized by a system herein to detect alert patterns in which there is an increased risk of data loss, for instance, so that a user can then efficiently prioritize tasks. The lookup table can comprise a broad range of devices and available statuses. Information for all relevant hardware can be included in the data table (e.g., lookup table), including a plurality of generations of hardware. The lookup table can comprise third-party and/or competitor device information and is thus not limited to certain manufactures or brands of hardware. If a drive in a scanned data rack is not cataloged within the lookup table, a system herein can generate an indication that the drive is not registered. In various embodiments, the system can then register the drive in the data table (e.g., lookup table). A downloaded version of this lookup table can offer functionality in data centers that comprise security-related limitations, such as dark sites.

Additional functionality can be enabled via system connection to APIs or device identifiers (e.g., QR codes or barcodes on drives or other rack hardware herein). A connection with the associated hardware and/or API enables generation of additional context alongside the status indicators. In various embodiments herein, additional details about the scanned drives, which may otherwise be restricted to the product's user interface (UI) (which may be inaccessible from within the secure datacenter), can be generated and/or presented via an XR UI. This API connection enables more robust recommended resolution guidance to be provided while the user is at the physical location of the drive, for instance, when that content may otherwise not be accessible within the datacenter. A scannable QR code or barcode (or another suitable identifier) affixed to corresponding hardware (e.g., a drive) can enhance the accuracy of this functionality and/or enable an additional option at datacenters that prohibit networked devices (e.g., nonlimiting example systems herein). Leveraging APIs and/or identifiers herein enable the system to more accurately, efficiently, and effectively detect drive status, even in environments where wires, faceplates, or other physical obstructions obscure visibility.

Embodiments herein enable a prioritized and filtered view of drive racks in a datacenter. Rather than attending equally to all indicators signaling an unhealthy state, a system herein can enable a user to filter out the excess noise and focus on the highest-priority issues. While various racks may display comparable amber lights, the system herein can identify which of these indicators are most likely to result in a data loss or data unavailable (DUDL) situation.

Further, via a system herein, a user can designate what is most important to the user and customize priority levels beyond the default settings. Thus, if a user regularly ignores a particular drive due to a known and accepted issue, the user can (e.g., via the system) reduce the visual noise associated with that known and accepted issue.

Leveraging the API or QR codes for device identification additionally enables a user to leverage historical information corresponding to various data center hardware. The UI herein can provide an option for the user to (e.g., manually, or automatically) mark a drive as replaced and store this historical data along with a log of that drive's historical scanned statuses. The XR system herein can then identify and notify the user about drive problems, such as a drive that fails more frequently than average. This insight via a system herein enables users to make an informed decision, while engaging with the physical drive, regarding how to address the issue. For example, a system herein can determine that a seemingly useable drive has experienced frequent failures, and a user may thus fully replace the drive rather than simply rebooting it again. In one or more embodiments, the system herein can recommend such a drive replacement.

It is noted that embodiments herein facilitate accommodation for users with reduced visual acuity. Most blindness and visual impairments are not characterized by total blindness or no light perception (NLP), but instead are variations of reduced visual ability. This reduced visual ability can take the form of the ability to see only a small field of vision for some, while others may have a broad field of vision but disruptive blurring or blind spots throughout (e.g., with diabetic retinopathy). Embodiments herein facilitate enhanced visibility within an XR interface, in addition to compatibility with screen readers, for instance, due to conveyance of physical information within a digital interface. By utilizing one or more embodiments herein, a user with diabetic retinopathy or tunnel vision can be informed by a system herein (e.g., using screen reader technology) exactly where to focus attention toward the most problematic drives. With a screen reader herein, the user can be enabled to navigate directly to this drive based on an audio description and be enabled to proceed with their work with reduced need for visual acuity. By leveraging embodiments herein, users are enabled to easily access drive status information either by the design of the XR interface itself or through associated screen reader technology. Alternate XR technologies, such as gloves offering haptic feedback signals, may also be utilized to further reduce user reliance on their own visual capabilities.

Beyond visual acuity challenges, the use of more standardized indicators surfaced in the XR interface increases accessibility, for instance, for neurodivergent individuals. By reducing the need to mentally keep track of various indicator configurations and meanings, user attention can be more focused, and users can be less prone to distraction or overwhelm. This is valuable for all users, but especially applicable for those who experience attentional difficulties.

It is noted that XR scanning of indicators (e.g., indicator lights) herein is not limited to drive of data racks in data centers. Such examples are nonlimiting. Other nonlimiting applications of XR scanning herein can comprise a warehouse environment (e.g., if looking for a particular item in a warehouse or packing items for shipment), retail environment (e.g., determining which items need to be restocked), grocery environment (e.g., determining which groceries need to be restocked), manufacturing (e.g., determining operational status), transportation (e.g., determining automotive, nautical, or aeronautical indicator or maintenance light status), healthcare (e.g., determining medical equipment status), or other suitable environments.

Turning now to FIG. 1, there is illustrated an example, non-limiting system 102 (e.g., an XR drive scanning system) in accordance with one or more example embodiments herein. System 102 can comprise a computerized tool, which can be configured to perform various operations relating to extended reality drive scanning. The system 102 can comprise one or more of a variety of components, such as memory 104, processor 106, bus 108, computer executable components 110, camera 112, and/or data table 114. In various embodiments, one or more of the memory 104, processor 106, bus 108, computer executable components 110, camera 112, and/or data table 114 can be communicatively or operably coupled (e.g., over a bus or wireless network) to one another to perform one or more functions of the system 102.

In various embodiments, the system 102 can comprise and/or be communicatively coupled to a haptic ring 124, a haptic glove 126, a mobile device 128 (e.g., a smartphone, smartwatch, wearable device, tablet, PDA, computer, smart camera, or another suitable mobile device), and/or XR glasses 130. In various embodiments, the haptic ring 124 or haptic glove 126 can be utilized (e.g., via a system 102 herein) to provide haptic feedback to a user of the system 102, for instance, based on proximity to a drive 118 herein, applicable to a maintenance status of the respective drive 118. Such a haptic ring 124 can comprise a wearable device that provides tactile feedback through vibrations or other tactile sensations. The haptic ring 124 can comprise a wireless connection to a system 102 herein and can be utilized in conjunction with a camera 112 herein. The haptic glove 126 can comprise a wearable device that provides tactile feedback through vibrations or other tactile sensations. The haptic glove 126 can comprise a wireless connection to a system 102 herein and can be utilized in conjunction with a camera 112 herein.

In various embodiments, the mobile device 128 or XR glasses 130 can be utilized (e.g., via a system 102 herein) to facilitate an XR UI applicable to a maintenance status of the respective drive 118. In this regard, the mobile device 128 can display an XR overlay overtop a live or recorded image or video of a drive rack herein. Similarly, the XR glasses 130 can display an XR overlay overtop a live or recorded image or video of a drive rack herein.

In various embodiments, the system 102 can be utilized for scanning of a drive rack 116. The drive rack 116 can comprise a group of drives. The group of drives can comprise, for instance, drive 118(a), drive 118(b), drive 118(c), drive 118(d), drive 118(e), and/or drive 118(f). It is noted that the drive rack 116 can comprise any suitable quantity of drives 118. The drives 118 can comprise one or more respective indicators (e.g., indicator light 120) and/or one or more respective identifiers (e.g., an identifier 122 such as a QR code, a barcode, or another suitable respective unique identifier). The indicator light 120 can indicate a variety of maintenance statuses (e.g., healthy and/or alert states). Such statuses can comprise one or more of a power status, activity/access status, error/fault status, drive health, drive identification, redundant array of independent risks (RAID) status, or other suitable statuses.

Figure 2:
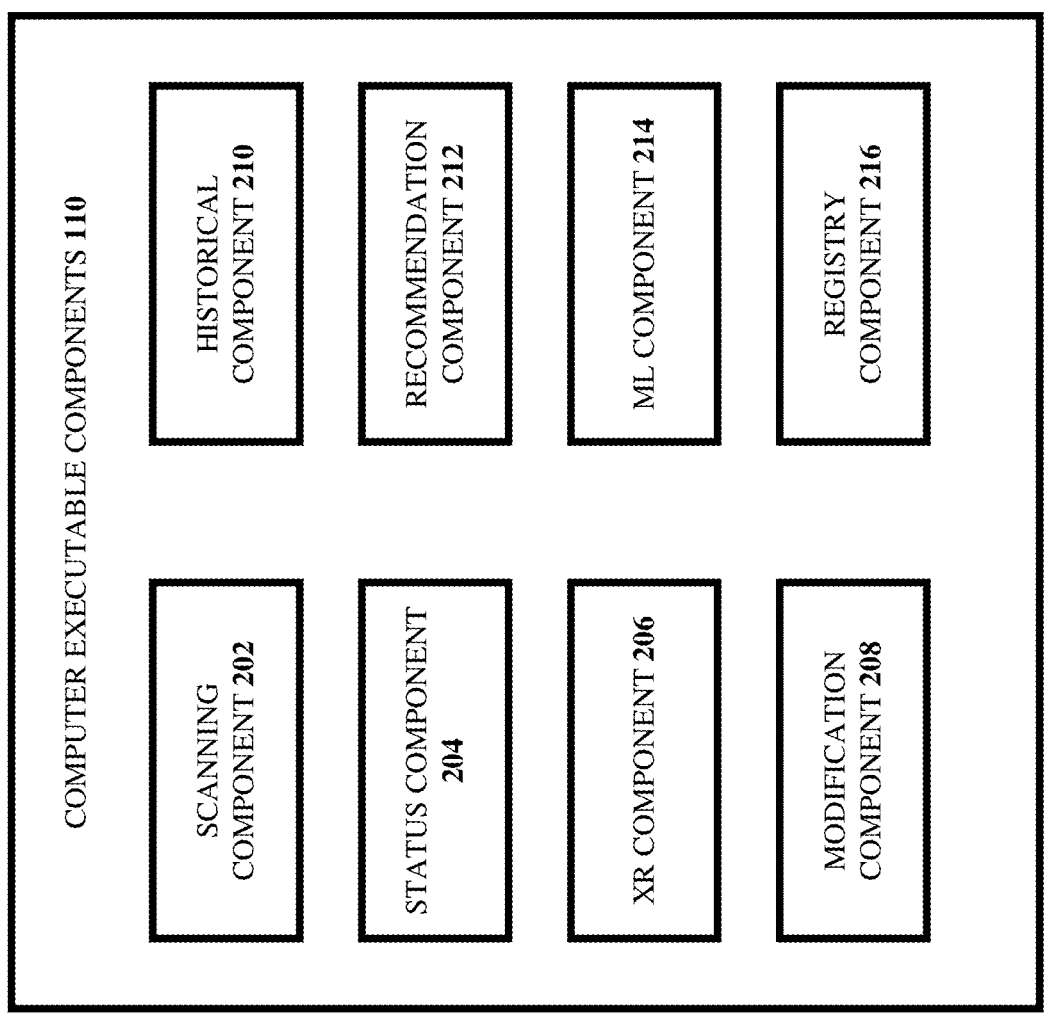
FIG. 2 is a block diagram of non-limiting example computer executable components in accordance with one or more example embodiments described herein.

FIG. 2 illustrates a block diagram of example, non-limiting computer executable components 110 that can facilitate extended reality drive scanning in accordance with one or more embodiments described herein. Repetitive description of like elements employed in other embodiments described herein is omitted for sake of brevity. As shown in FIG. 2, the one or more computer executable components 110 can comprise scanning component 202, status component 204, XR component 206, modification component 208, historical component 210, recommendation component 212, machine learning (ML) component 214, and/or registry component 216.

According to an embodiment, the scanning component 202 can scan (e.g., via camera 112), a drive rack 116, which can comprise a group of drives 118. The camera 112 can comprise one or more of a red, green, blue (RGB) camera, depth camera, stereo camera, infrared (IR) camera, eye tracking camera, facial recognition camera, motion capture camera, or other suitable cameras. In this regard, the camera 112 can comprise an array of a plurality of camera sensors that can be collectively utilized by the scanning component 202 or another suitable component. In various embodiments, the scanning component 202 can be configured to utilize the camera 112 to scan a drive rack 116 for indicator lights 120 and/or identifiers 122 for further analysis. In this regard, the scanning component 202 can be configured to detect a single maintenance light or identifier 122, or a plurality of each of an indicator light 120 and/or identifier 122 (e.g., of a plurality of drives 118) in a drive rack 116.

According to an embodiment, the status component 204 can, based on an indicator light 120 of a drive 118 of the group of drives and an identifier 122 of the drive 118 (e.g., that have been scanned via the scanning component 202), determine a maintenance status of the drive 118. Such statuses can comprise one or more of a power status, activity/access status, error/fault status, drive health, drive identification, redundant array of independent risks (RAID) status, or other suitable statuses. In various embodiments, the maintenance status of the drive can be determined (e.g., via the status component 204) based on a comparison (e.g., by the status component 204) of a blinking pattern of the indicator light 120, a color of the indicator light 120 for a model of drive applicable to the drive 118 to a data table 114 of blinking patterns and colors, and/or based on shape, size, and/or placement of the indicator light 120 and/or identifier 122. In this regard, the data table 114 can comprise blinking patterns and colors per model of the group of drives, and/or by shape, size, and/or placement of the indicator lights and/or identifiers herein. By matching (e.g., by the status component 204) the observed indicator light 120 (e.g., blinking pattern and/or color) (and/or the shape, size, and/or placement of the indicator light 120 and/or identifier 122) to an entry in the data table 114 of blinking patterns and colors (e.g., and/or shape, size, and/or placement of the indicator lights or identifiers herein), the status of the drive 118 can be determined. The status component 204 can utilize the identifier 122 of the drive 118 to determine the manufacturer and/or model of a respective drive 118 so that the blinking pattern, color, shape, size, and/or placement of the indicator light 120 and/or identifier 122 can be accurately matched to the correct entry(s) of the data table 114.

According to an embodiment, the XR component 206 can, based on the maintenance status of the drive 118, generate an XR UI applicable to the maintenance status of the drive 118. In one or more embodiments, the XR UI can comprise an overlay on a screen of a mobile device 128. In this regard, the mobile device 128 comprise the camera 112, though in some embodiments, the mobile device 128 and the camera 112 can comprise separate devices. Further in this regard, the overlay can comprise a color-coded overlay. In further embodiments, the XR UI can comprise an overlay generated via XR glasses 130. In this regard, the XR glasses 130 can be utilized to capture the relevant information (e.g., indicator light 120 and/or identifier 122) and render status details through the XR glasses 130. The foregoing enables hands-free scanning of the drive rack 116. The XR component 206 can generate overlays of various shapes and colors. For instance, the XR component 206 can generate an outline to be overlayed over one or more of the drives 118 (e.g., via the XR UI). The outline can correspond to a maintenance status of the drive 118, which can be configured to attract attention to the respective drive 118.

Figure 3:
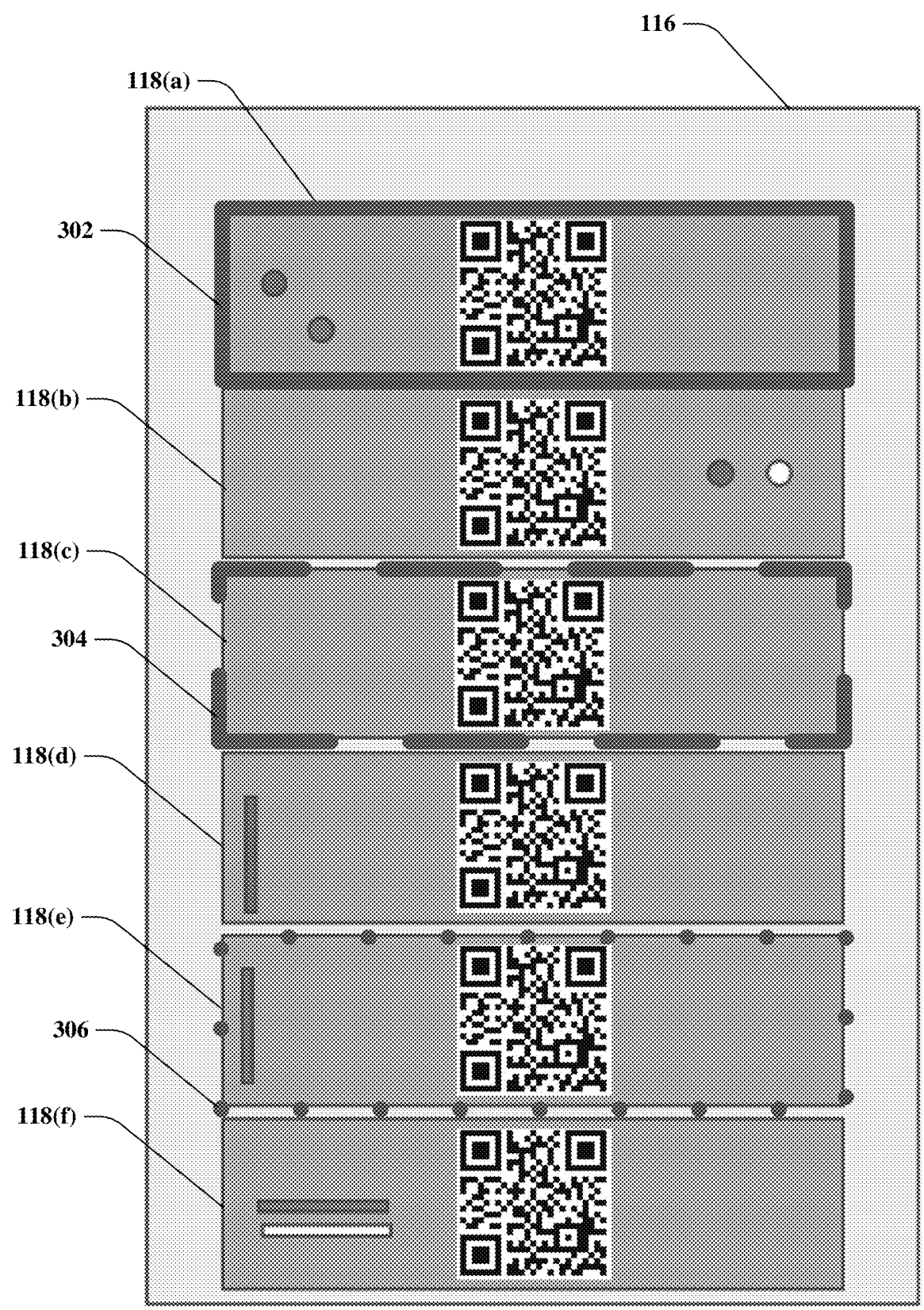
FIG. 3 illustrates a non-limiting example drive rack in accordance with one or more example embodiments described herein.

FIG. 3 illustrates an example view of the XR UI with respect to the drive rack 116, which can comprise drives 118 respectively comprising indicators of various shapes, colors, sizes, and/or placements. For example, the drives 118 can comprise indicators comprising circles of different colors and in different locations, as well as bars in different colors, locations, and/or orientations. The system 102 can scan (e.g., via the scanning component 202) for unhealthy drives (e.g., drives determined via the status component 204 to comprise a maintenance status) and generate (e.g., via the XR component 206) a uniform overlay (in this nonlimiting example, a thick outline 302, a dashed outline 304, and/or a dotted outline 306, depending on the corresponding maintenance status) to attract attention to unhealthy drives 118. Further, the overlay can be generated (e.g., via the XR component 206) for a drive 118 that lacks any active indicator lights 120.

In some embodiments, the XR component 206 can generate the XR UI live (e.g., in real time) while recording (e.g., via the camera 112). In another embodiment, the scanning component 202 can record drive racks 116 for bulk capture for subsequent analysis via the system 102. In this regard, the status component 204 can determine the maintenance status of the drives 118 after the bulk capture via the scanning component 202. The foregoing enables a user to walk at a moderate pace through a data center while using minimal attention, then pinpoint and review the identified issues (e.g., identified via the system 102) at their convenience.

Figure 4A:
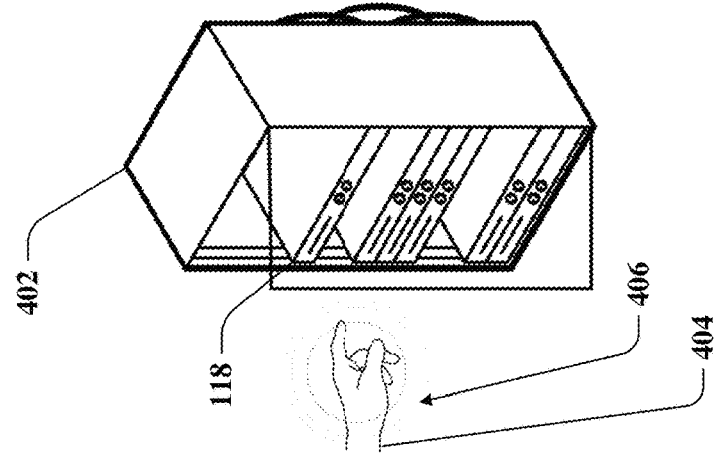
FIGS. 4a-4d illustrate non-limiting example haptic feedback in accordance with one or more example embodiments described herein.
Figure 4B:
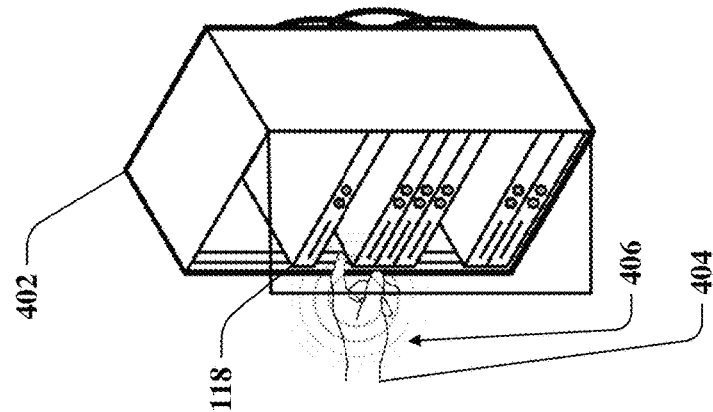
Figure 4C:
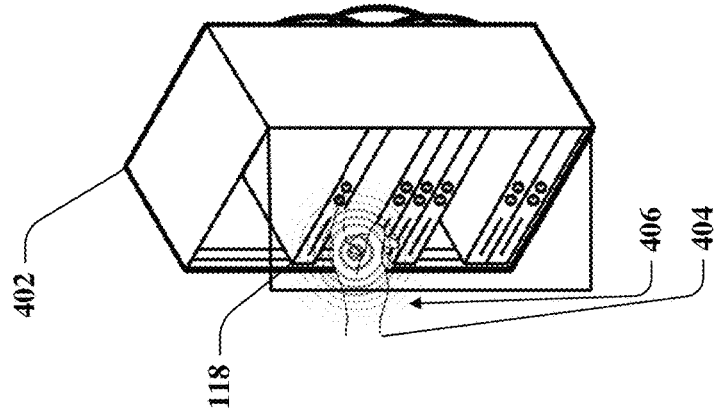
Figure 4D:
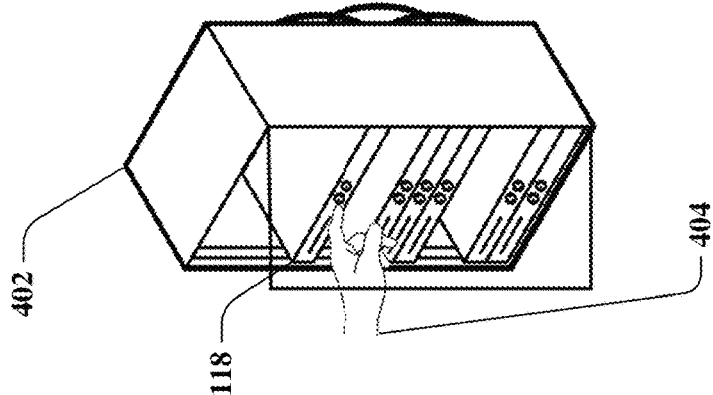

In additional embodiments, the XR UI can comprise (and/or be communicatively coupled to) a haptic device. In this regard, the haptic device can generate haptic feedback at a defined rate based on an observed (e.g., via the scanning component 202 and/or camera 112) distance from the drive 118. For instance, the haptic device can comprise a haptic glove 126, a haptic ring 124, or another suitable haptic device. By leveraging a haptic device herein (e.g., a haptic wearable device), a user is enabled to move their hand near a drive rack 116 and receive an indication (e.g., via the haptic device) such as a vibration or notification in associated auditory technology (e.g., earbuds or headphones) when a hardware issue applicable to a drive 118 herein (e.g., maintenance event) is detected (e.g., via the status component 204) on a drive 118 adjacent to that hand (e.g., the hand holding or wearing the haptic device). With a hand already at the relevant location, the user is enabled (e.g., via a system 102 herein) to focus their attention on that drive 118. This option is particularly valuable in cases of limited visual capability, such as with users experiencing tunnel vision. In this regard, consider FIGS. 4a-4d, which depict data rack 402 comprising drive 118. With regard to FIG. 4a, if there exists an issue with the drive 118, the haptic device (e.g., a haptic glove 404) can be configured to generate a haptic sensation 406 as the scanning component 202 and/or camera 112 detects threshold proximity between the haptic device and the drive 118. The haptic sensation 406 can be configured to intensify as the distance (e.g., as determined via the scanning component 202 and/or camera 112) between the haptic glove 404 and the drive 118 becomes smaller, as depicted in FIG. 4*b*. With respect to FIG. 4*c*, as the haptic glove 404 reaches the drive 118 at issue, the haptic sensation 406 can be configured to be generated (e.g., via the haptic glove 404 or via another haptic device such as a haptic ring) at maximum intensity, indicating that the drive 118 has been located. With respect to FIG. 4*d*, after the maintenance event applicable to the drive 118 has been determined to have ended (e.g., via the status component 204), the haptic sensation 406 can be configured to terminate.

According to an embodiment, the modification component 208 can, in response to a change in the maintenance status of the drive 118, modify the XR UI based on the change in the maintenance status of the drive 118. In this regard, after a user or the system 102 has corrected a maintenance issue with the drive 118 (e.g., restarted, replaced, or otherwise corrected the drive 118), the scanning component 202 can detect the change in the indicator light, and the status component 204 can determine that the indicator light 120 has changed to indicate that no problem exists. Further in this regard, the modification component 208 can then modify the corresponding XR UI. In various embodiments, the change in the XR UI can comprise a change in color and/or pattern of the corresponding overlay or can comprise another indication on the XR UI that the drive 118 previously at issue is no longer at issue.

According to an embodiment, the historical component 210 can, based on the identifier 122 of the drive 118, determine historical maintenance information applicable to the drive 118. In this regard, the historical maintenance information can be displayed (e.g., via the XR component 206) via the XR UI. Such historical maintenance information can comprise, for instance records of past maintenance activities performed on the drive 118, such as firmware updates, drive replacements, repairs, or other suitable past maintenance activities. The historical maintenance information can additionally, or alternatively, comprise maintenance schedules, logs of diagnostic tests, and/or any issues encountered during maintenance procedures applicable to a respective drive 118 in a drive rack 116.

According to an embodiment, the recommendation component 212 can, based on the maintenance status of the drive 118, generate a recommended action to correct a malfunction of the drive 118. In this regard, the recommended action can be determined (e.g., via the recommendation component 212) based on a comparison of the maintenance status for a model of drive applicable to the drive 118 to a maintenance data table. Further in this regard, the maintenance data table can comprise recommended actions per model of the group of drives. In various embodiments, the maintenance data table can comprise prescribed maintenance actions that correspond to defined indicator light patterns for one or more drives 118, based on drive 118 model and/or manufacturer.

According to an embodiment, the ML component 214 can, based on the maintenance status of the drive 118, generate a recommended action to correct a malfunction of the drive 118. In this regard, the recommended action can be determined (e.g., via the ML component 214) using machine learning trained based on prior actions to correct prior malfunctions of other drives, other than the drive 118. In various embodiments, the ML component 214 can generate training data based on the prior actions to correct prior malfunctions of other drives, other than the drive 118. The ML component 214 can normalize and/or standardize maintenance logs in order to generate the training data. Using the training data, the ML component 214 can learn actions to correct drive 118 malfunctions based on success or failure of previous maintenance actions.

According to an embodiment, the registry component 216 can, in response to a determination (e.g., via the registry component 216) that, based on the identifier 122 of the drive 118, the drive 118 is not registered in a defined drive registry, add data applicable to the drive 118 to the defined drive registry. In this regard, if the scanning component 202 scans a drive 118 that is not registered in the defined drive registry, the drive 118 can be added (e.g., via the registry component 216) to the defined drive registry. The registry component 216 can further associate an identifier 122 applicable to the drive 118 with the drive 118 in the defined drive registry. The registry component 216 can additionally associate drive 118 manufacturer and/or model information, so that the indicator light 120 patterns and/or colors can be utilized for drive 118 status determination via the status component 204 when scanned via the scanning component 202.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 214 can comprise an AI and/or ML model that can be trained (e.g., via supervised and/or unsupervised techniques) to perform the above or below-described functions using historical training data comprising various context conditions that correspond to various augmented network optimization operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the ML component 214. In this example, such feedback data can comprise the various instructions described above/below that can be input, for instance, to a system herein, over time in response to observed/stored context-based information.

AI/ML components herein can initiate an operation(s) associated with extended reality drive scanning based on a defined level of confidence determined using information (e.g., feedback data). For example, based on learning to perform such functions described above using feedback data, performance information, and/or past performance information herein, an ML component 214 herein can initiate an operation associated with determining various thresholds herein.

In an embodiment, the ML component 214 can perform a utility-based analysis that factors cost of initiating the above-described operations versus benefit. In this embodiment, the ML component 214 can use one or more additional context conditions to determine various thresholds herein.

To facilitate the above-described functions, the ML component 214 herein can perform classifications, correlations, inferences, and/or expressions associated with principles of artificial intelligence. For instance, the ML component 214 can employ an automatic classification system and/or an automatic classification. In one example, the ML component 214 can employ a probabilistic and/or statistical-based analysis (e.g., factoring into the analysis utilities and costs) to learn and/or generate inferences. The ML component 214 can employ any suitable machine-learning based techniques, statistical-based techniques and/or probabilistic-based techniques. For example, the ML component 214 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 214 can perform a set of machine-learning computations. For instance, the ML component 214 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 5:
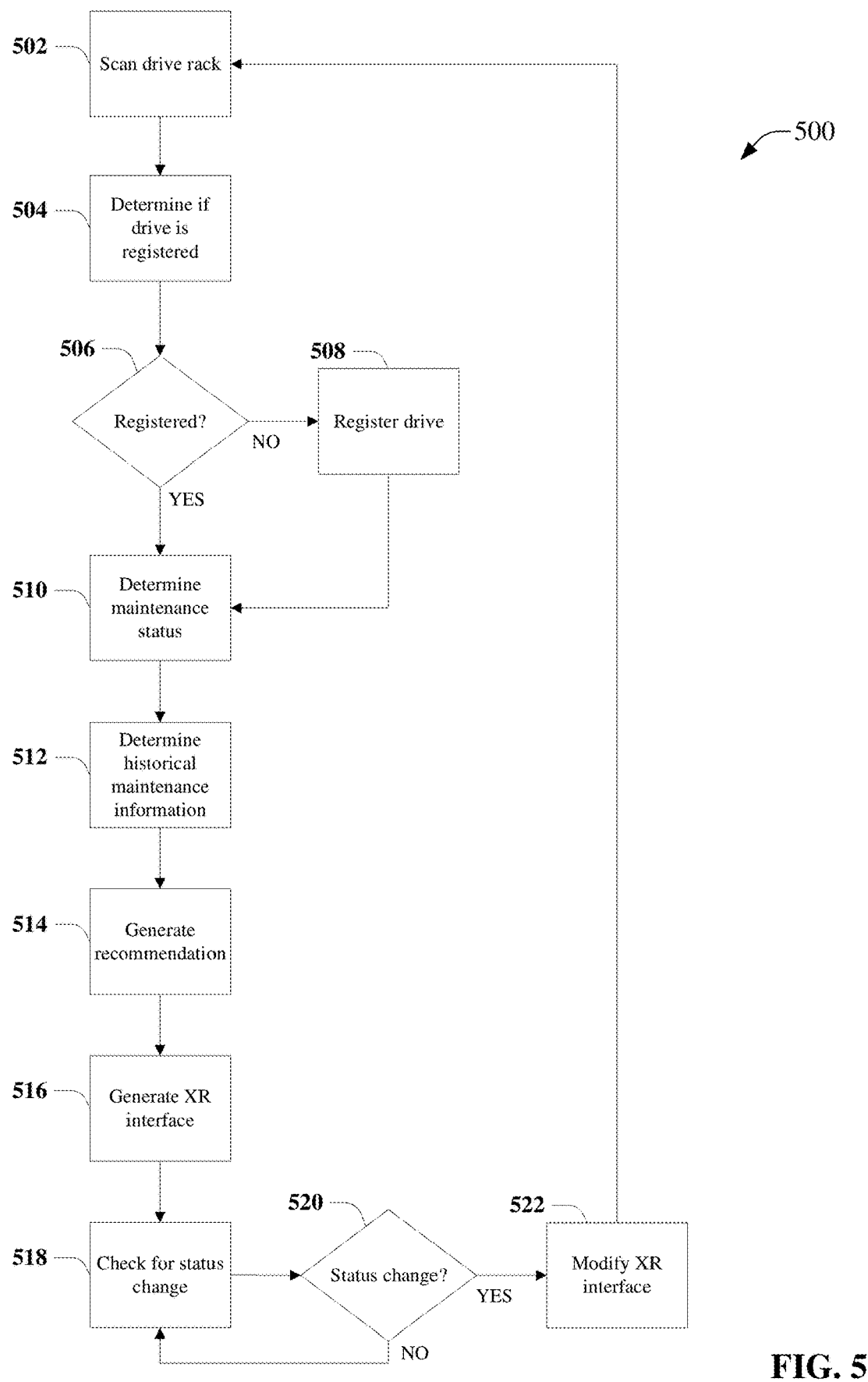
FIG. 5 is a flowchart for a process associated with extended reality drive scanning in accordance with one or more example embodiments described herein.

FIG. 5 is a flowchart for a process 500 associated with extended reality drive scanning in accordance with one or more example embodiments described herein. At 502, the scanning component 202 can scan a drive rack 116, which can comprise a group of drives 118. At 504, the registry component 216 can determine if a scanned drive is registered with the system 102 (e.g., comprises a corresponding entry in a defined drive registry) based on a determination (e.g., via the registry component 216) of whether an identifier 122 applicable to the respective drive 118 comprises a corresponding entry in the defined drive registry. At 506, in response to a determination (e.g., via the registry component 216) that, based on the identifier 122 of the drive 118, the drive 118 is not registered in the defined drive registry (e.g., NO at 506), add data applicable to the drive 118 to the defined drive registry at 508. If at 506, the drive is determined to be registered (e.g., YES at 506), the process can proceed to 510. At 510, the status component 204 can, based on an indicator light 120 of the drive 118 an identifier 122 of the drive 118, determine a maintenance status of the drive 118. At 512, the historical component 210 can, based on the identifier 122 of the drive 118, determine historical maintenance information applicable to the drive 118. At 514, the recommendation component 212 and/or the ML component 214 can, based on the maintenance status of the drive 118, generate a recommended action to correct a malfunction of the drive 118. For example, the recommendation component 212 can determine the recommended action based on a comparison of the maintenance status for a model of drive applicable to the drive 118 to a maintenance data table, which can comprise comprises recommended actions per model of the group of drives. In another example, the ML component 214 can determine the recommended action using machine learning trained based on prior actions to correct prior malfunctions of other drives, other than the drive 118. At 516, the XR component 206 can, based on the maintenance status of the drive 118 and/or the historical maintenance information of the drive 118, generate an XR UI applicable to the maintenance status of the drive. Such an XR UI can be rendered, for instance, via a mobile device 128, XR glasses 130, or via another suitable XR UI. At 518, the status component 204 can check for a status change in the drive 118 (e.g., in response to a maintenance action being completed and/or determined to have been completed). The status component 204 can make such a determination, for instance, via scanning of the indicator light 120 of the drive 118. At 520, if the status is not changed (e.g., NO at 520), the process can return to 518 or another suitable step. If at 520, the status is changed (e.g., YES at 520) the process can proceed to 522. At 522, the modification component 208 can, in response to the change in the maintenance status of the drive 118, modify the XR UI based on the change in the maintenance status of the drive 118.

Figure 6:
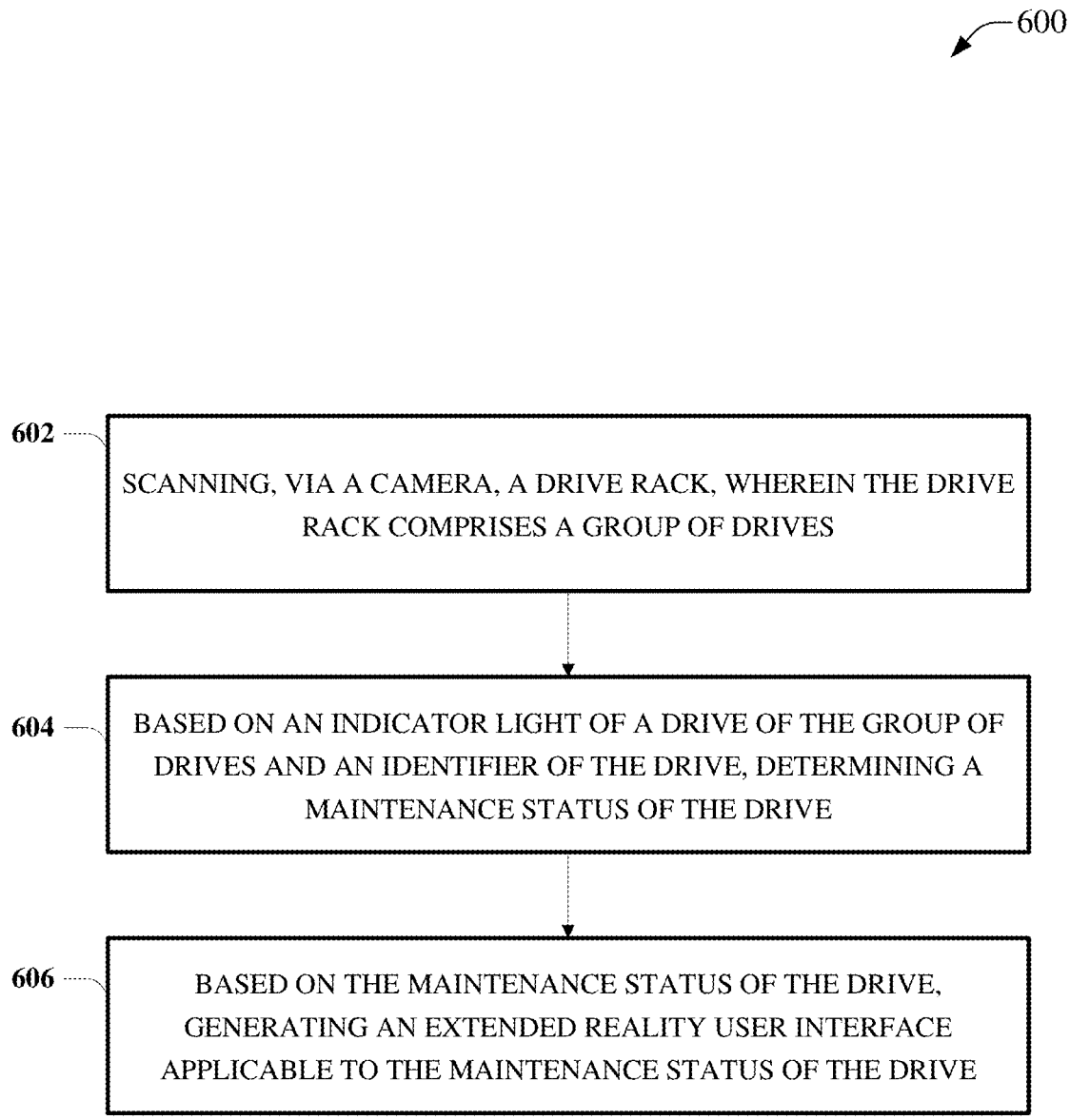
FIG. 6 is a block flow diagram for a process associated with extended reality drive scanning in accordance with one or more example embodiments described herein.

FIG. 6 illustrates a block flow diagram for a process 600 associated with extended reality drive scanning in accordance with one or more embodiments described herein. At 602, the process 600 can comprise scanning (e.g., via the scanning component 202), via a camera (e.g., camera 112), a drive rack (e.g., drive rack 116), wherein the drive rack 116 comprises a group of drives (e.g., drives 118). At 604, the process 600 can comprise, based on an indicator light (e.g., light 120) of a drive 118 of the group of drives and an identifier 122 of the drive 118, determining (e.g., via the status component 204) a maintenance status of the drive 118. At 606, the process 600 can comprise, based on the maintenance status of the drive 118, generating (e.g., via the XR component 206) an XR UI applicable to the maintenance status of the drive 118.

Figure 7:
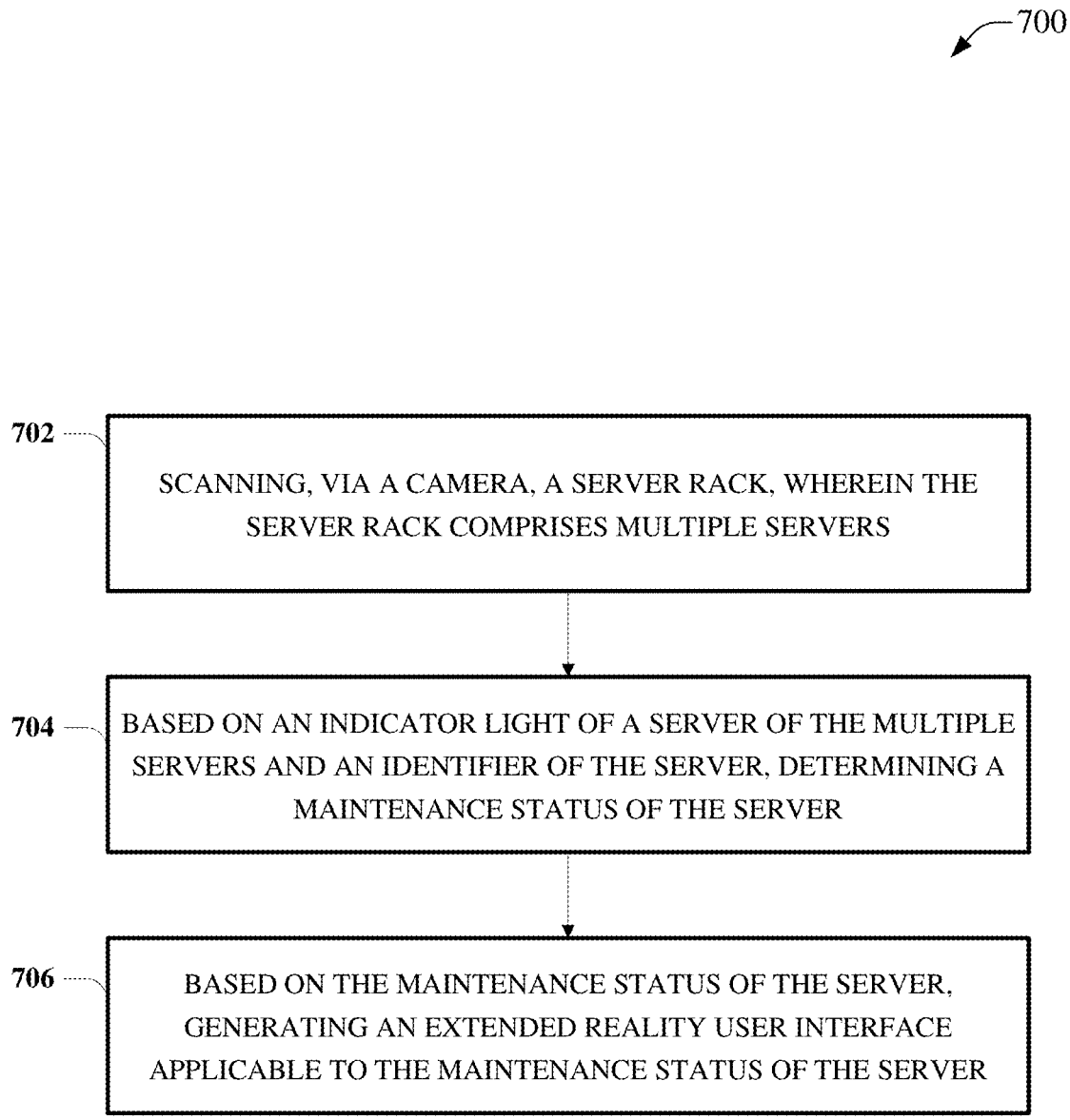
FIG. 7 is a block flow diagram for a process associated with extended reality drive scanning in accordance with one or more example embodiments described herein.

FIG. 7 illustrates a block flow diagram for a process 700 associated with extended reality drive scanning in accordance with one or more embodiments described herein. At 702, the process 700 can comprise scanning (e.g., via the scanning component 202), via a camera (e.g., camera 112), a server rack (e.g., drive rack 116), wherein the server rack comprises multiple servers (e.g., drives 118). At 704, the process 700 can comprise, based on an indicator light 120 of a server of the multiple servers and an identifier 122 of the server (e.g., drive 118), determining (e.g., via the status component 204) a maintenance status of the server (e.g., drive 118). At 706, the process 700 can comprise, based on the maintenance status of the server (e.g., drive 118), generating (e.g., via the XR component 206) an XR UI applicable to the maintenance status of the server (e.g., drive 118).

Figure 8:
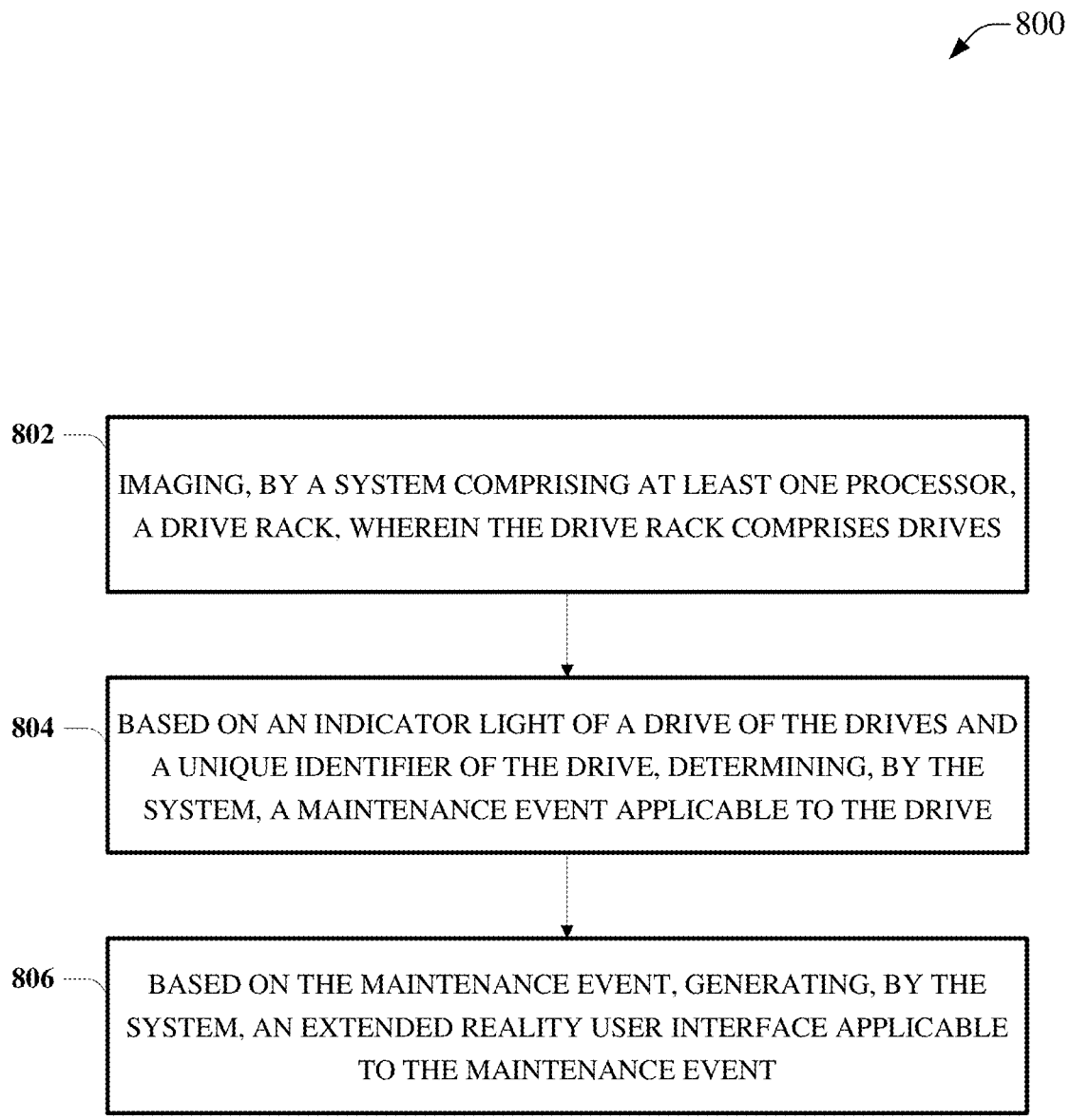
FIG. 8 is a block flow diagram for a process associated with extended reality drive scanning in accordance with one or more example embodiments described herein.

FIG. 8 illustrates a block flow diagram for a process 800 associated with extended reality drive scanning in accordance with one or more embodiments described herein. At 802, the process 800 can comprise imaging (e.g., via the scanning component 202), by a system (e.g., system 102) comprising at least one processor, a drive rack (e.g., drive rack 116), wherein the drive rack comprises drives (e.g., drives 118). At 804, the process 800 can comprise, based on an indicator light 120 of a drive 118 of the drives and a unique identifier (e.g., identifier 122) of the drive 118, determining (e.g., via the status component 204), by the system (e.g., system 102), a maintenance event applicable to the drive (e.g., drive 118). At 806, the process 800 can comprise, based on the maintenance event, generating (e.g., via the XR component 206), by the system (e.g., system 102), an XR UI applicable to the maintenance event.

Figure 9:
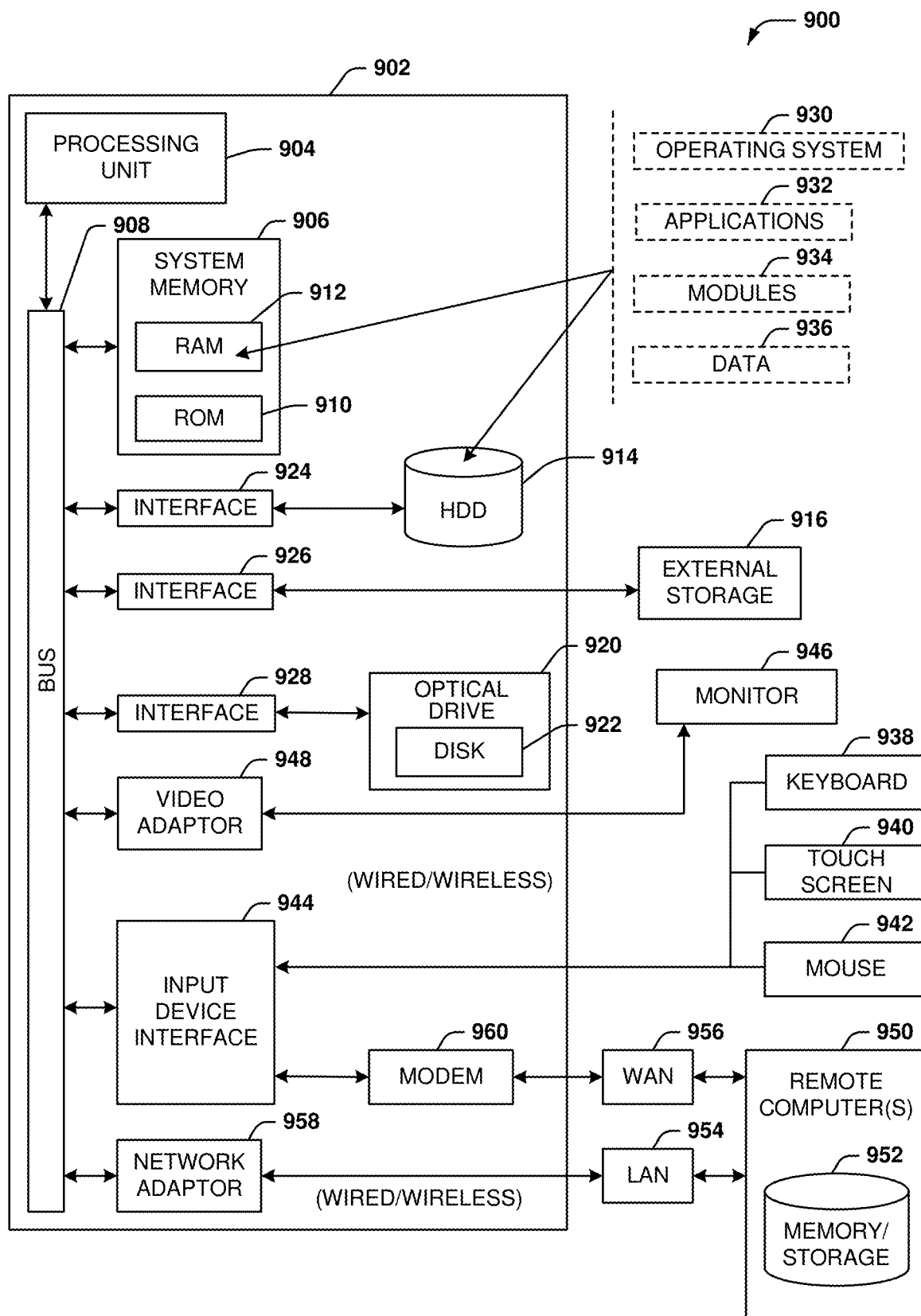
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
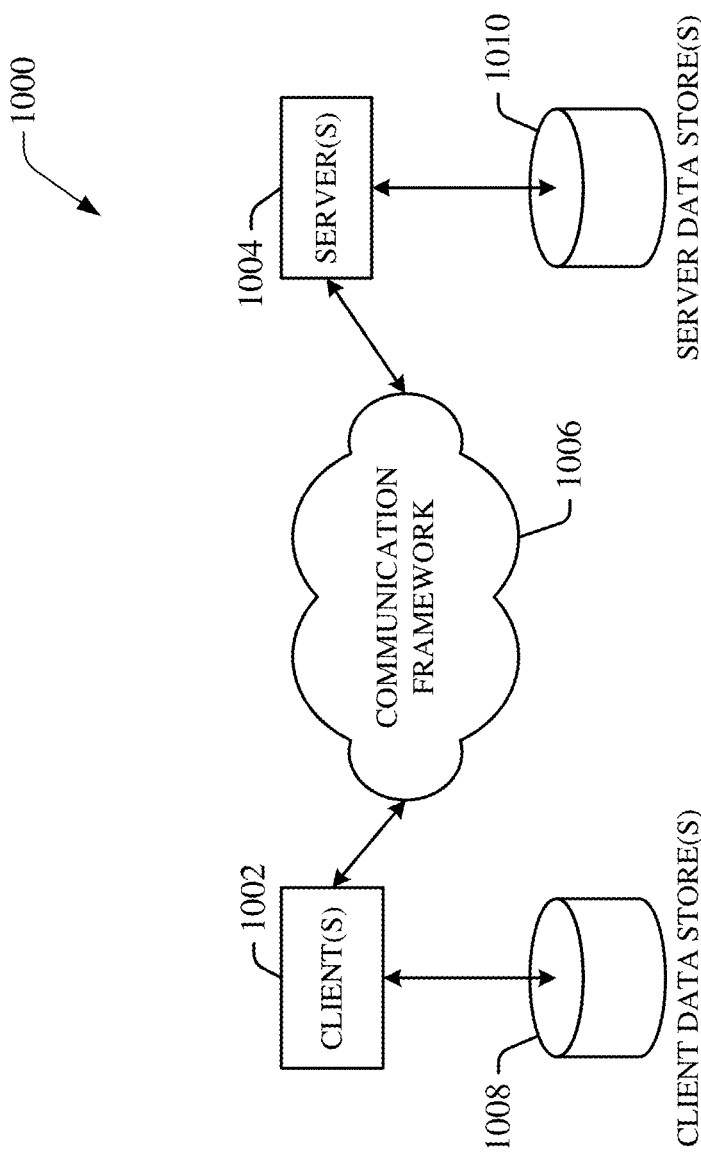
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    at least one processor; and
    at least one memory that stores executable instructions that, when executed by the at least one processor, facilitate performance of operations, comprising:
    scanning, via a camera, a drive rack, wherein the drive rack comprises a group of drives;
    based on an indicator light of a drive of the group of drives and an identifier of the drive, determining a maintenance status of the drive;
    based on the maintenance status of the drive, generating an extended reality user interface applicable to the maintenance status of the drive; and
    based on the maintenance status of the drive, generating a recommended action to correct a malfunction of the drive, wherein the recommended action is determined based on a comparison of the maintenance status for a model of drive applicable to the drive to a maintenance data table, and wherein the maintenance data table comprises recommended actions per model of the group of drives.

2. The system of claim 1, wherein the extended reality user interface comprises an overlay on a screen of a mobile device, wherein the mobile device comprises the camera, and wherein the overlay is rendered on the screen of the mobile device in real time or stored to the memory.

3. The system of claim 2, wherein the overlay comprises a color-coded overlay.

4. The system of claim 1, wherein the extended reality user interface comprises an overlay generated via extended reality glasses.

5. The system of claim 1, wherein the extended reality user interface comprises a haptic device, and wherein the haptic device generates haptic feedback at a rate based on a distance from the drive.

6. The system of claim 5, wherein the haptic device comprises a haptic glove, a haptic ring, or another means of delivering information through haptic feedback.

7. The system of claim 1, wherein the maintenance status of the drive is determined based on a comparison of a blinking pattern of the indicator light, a color of the indicator light, a shape of the indicator light, a size of the indicator light, or a placement of the indicator light for a model of drive applicable to the drive to a data table of blinking patterns, and wherein the data table comprises blinking patterns and colors per model of the group of drives.

8. The system of claim 1, wherein the operations further comprise:
in response to a change in the maintenance status of the drive, modifying the extended reality user interface based on the change in the maintenance status of the drive.

9. The system of claim 1, wherein the operations further comprise:
based on the identifier of the drive, determining historical maintenance information applicable to the drive, wherein the historical maintenance information is displayed via the extended reality user interface.

10. The system of claim 1, wherein the operations further comprise:
based on the maintenance status of the drive, generating a recommended action to correct a malfunction of the drive, wherein the recommended action is determined using machine learning trained based on prior actions to correct prior malfunctions of other drives, other than the drive.

11. The system of claim 1, wherein the operations further comprise:
in response to a determination that, based on the identifier of the drive, the drive is not registered in a defined drive registry, adding data applicable to the drive to the defined drive registry.

12. A non-transitory machine-readable medium, comprising executable instructions that, when executed by at least one processor, facilitate performance of operations, comprising:
scanning, via a camera, a server rack, wherein the server rack comprises multiple servers;
based on an indicator light of a server of the multiple servers and an identifier of the server, determining a maintenance status of the server;
based on the maintenance status of the server, generating an extended reality user interface applicable to the maintenance status of the server; and
based on the maintenance status of the server, generating a recommended action to correct a malfunction of the server, wherein the recommended action is determined based on a comparison of the maintenance status for a model of server applicable to the server to a maintenance data table, and wherein the maintenance data table comprises recommended actions per model of the multiple servers.

13. The non-transitory machine-readable medium of claim 12, wherein the extended reality user interface comprises an overlay on a screen of a mobile device, and wherein the mobile device comprises the camera.

14. The non-transitory machine-readable medium of claim 13, wherein the overlay comprises a color-coded overlay.

15. The non-transitory machine-readable medium of claim 12, wherein the extended reality user interface comprises an overlay on extended reality glasses.

16. A method, comprising:
imaging, by a system comprising at least one processor, a drive rack, wherein the drive rack comprises drives;
based on an indicator light of a drive of the drives and a unique identifier of the drive, determining, by the system, a maintenance event applicable to the drive;
based on the maintenance event, generating, by the system, an extended reality user interface applicable to the maintenance event; and
based on the maintenance event, generating, by the system, a recommended action to correct a malfunction of the drive, wherein the recommended action is determined based on a comparison of the maintenance event for a model of drive applicable to the drive to a maintenance data table, and wherein the maintenance data table comprises recommended actions per model of the drives.

17. The method of claim 16, wherein the extended reality user interface comprises a haptic device, and wherein the haptic device outputs haptic feedback at a rate based on a distance from the drive.

18. The method of claim 17, wherein the haptic device comprises a haptic glove, a haptic ring, or another means of delivering information through haptic feedback.

19. The method of claim 16, wherein the maintenance event is determined based on a comparison of a blinking pattern of the indicator light, a color of the indicator light, a shape of the indicator light, a size of the indicator light, or a placement of the indicator light for a model of drive applicable to the drive to a data table of blinking patterns, and wherein the data table comprises blinking patterns and colors per model of the drives.

20. The method of claim 16, wherein the extended reality user interface comprises an overlay on a screen of a mobile device, wherein the mobile device comprises a camera that scans the drive rack, and wherein the overlay is rendered on the screen of the mobile device in real time or stored to a memory.

* * * * *